United States Patent
Pozgainer et al.

(10) Patent No.: US 6,446,686 B2
(45) Date of Patent: Sep. 10, 2002

(54) FILLER PIPE

(75) Inventors: Gunther Pozgainer, Graz; Wolfgang Suppan, Studenzen; Bernhard Maler, Bad Gleichenberg, all of (AT)

(73) Assignee: Tesma Motoren und Getriebetechnik GmbH, Weiz (AT)

( * ) Notice: Subject to any disclaimer, the term of this patent is extended or adjusted under 35 U.S.C. 154(b) by 0 days.

(21) Appl. No.: 09/822,183

(22) Filed: Mar. 30, 2001

(51) Int. Cl.[7] .................................................. B65B 1/04
(52) U.S. Cl. ........................ 141/350; 141/301; 220/86.2
(58) Field of Search ................................ 141/349, 350, 141/301; 220/86.2

(56) References Cited

U.S. PATENT DOCUMENTS 4,809,863 A * 3/1989 Woodcock et al.
4,977,936 A * 12/1990 Thompson et al.
6,092,685 A * 7/2000 Gruber

* cited by examiner

Primary Examiner—Steven O. Douglas
(74) Attorney, Agent, or Firm—Clark Hill PLC

(57) ABSTRACT

A filler pipe for the fuel tank of a motor vehicle having an internally located closure flap which closes a filling aperture at the end region of an internally located housing part made from plastic and can be brought into its open position by insertion of a fuel-pump nozzle in order to fill the fuel tank. An elastomeric seal is arranged on the housing part acting between the housing part and the closure flap. The seal is applied to a seal support which is connected to the plastic housing to provide a seal both relative to the closure flap and relative to the housing part.

4 Claims, 1 Drawing Sheet

FILLER PIPE

FIELD OF INVENTION

The invention relates to a filler pipe for the fuel tank of a motor vehicle having an internally located closure flap which closes a filling aperture at the end region of an internally located housing part made from plastic and can be brought into its open position by means of the fuel-pump nozzle in order to fill the fuel tank, an elastomeric seal arranged on the housing part acting between the housing part and the closure flap.

BACKGROUND OF INVENTION

Filler pipe for fuel tanks of motor vehicles are known, for example, in WO 99/03 697. The closure of this filler pipe is formed by an internally located closure flap. Therefore, in contrast to the customary designs otherwise in general use, no outer tank closure that can be screwed on or locked by means of a bayonet closure or the like is provided. Accordingly, the liquid- and gas-tight seal between the fuel tank on the one hand and the outer environment on the other is to be ensured by the valve closure. The housing part which, at its end region, forms the filling aperture to be closed by the closure flap is one of those components of the filler pipe that are made from plastic. It has proved inconvenient here that this plastic housing part swells as a result of the liquid fuel, or even as a result of fuel vapors, so that after a certain operating life optimum functioning of the elastomeric seal, which is merely seated in a circumferential groove of the housing, is no longer guaranteed when the closure flap is closed. As a result of the swelling of the plastic, the press-fit seating for the seal on the housing part is adversely affected.

SUMMARY OF INVENTION

The disadvantages of the prior art may be overcome by providing a filler pipe for a fuel tank of a motor vehicle comprising a tubular housing defining an aperture in fluid communication with the fuel tank. A closure flap is operatively coupled to the housing and operable between an open position opening the aperture for allowing fuel to fill the fuel tank and a closed position closing the aperture. An annular recess is formed in the tubular housing adjacent the aperture. An elastomeric seal is supported in the annular recess between the housing and the closure flap for providing a fluid impervious seal therebetween.

It is the object of the invention, which begins at this point, to provide a sealing concept which ensures a reliable and lasting sealing of the closure flap on the filling aperture in the event of any swelling of the plastic housing under the influence of fuel.

The stated object is achieved in part in that the seal is applied to a seal support which is connected to the plastic housing, the seal providing a seal both relative to the closure flap and relative to the housing part.

The effect of connecting a separate seal support to the housing part is to ensure that, even in the event of swelling of the plastic material of the housing, the seal is fixed in its position. The "double-action" seal, which provides a seal both relative to the closure flap and relative to the housing, guarantees the necessary and desirable sealing of the closure flap over the service life of the filler pipe.

The seal support may be connected to the housing part by positive fitting or by mechanical fixing. Both measures ensure secure retention of the seal support which cannot be released during operation.

According to a preferred embodiment of the invention, the seal support together with the seal is retained in at least one recess formed in the housing part. This measure also assists the retention of the seal.

The seal itself is provided with two sealing parts, for example sealing beads or sealing lips, one sealing part being capable of being supported on the closure flap and the second on the base of the recess. This effectively favors the desired sealing effect.

The seal is preferably vulcanized or injected onto the seal support. As a result, the seal is permanently retained on the seal support.

For the positive-fitting connection of the seal support to the housing part, provision is made, in particular, for the seal support to be provided with one or more anchoring parts which are retained by positive fitting or mechanically fixed in the region of the recess. As a result, the seal support is anchored on the housing in a manner that is particularly secure and substantially uninfluenced by possible swelling of the plastic material.

In a preferred, particularly durable method of connecting the seal support to the housing part, a marginal region of the housing part is flanged onto the anchoring part, for example by means of ultrasound. As an alternative to this, the seal support can also be connected by screwing, welding, clipping, or the like.

Particularly advantageous is an embodiment in which the two sealing parts of the seal produce a sealing effect at least substantially in the axial direction, based on the longitudinal axis of the housing. As a result, possible swelling of the plastic of the housing can be particularly easily compensated for by elastic deformation of the seal.

DESCRIPTION OF THE DRAWINGS

Other advantages of the present invention will be readily appreciated as the same becomes better understood by reference to the following detailed description when considered in connection with the accompanying drawings wherein.

DESCRIPTION OF THE INVENTION

Figure 1:
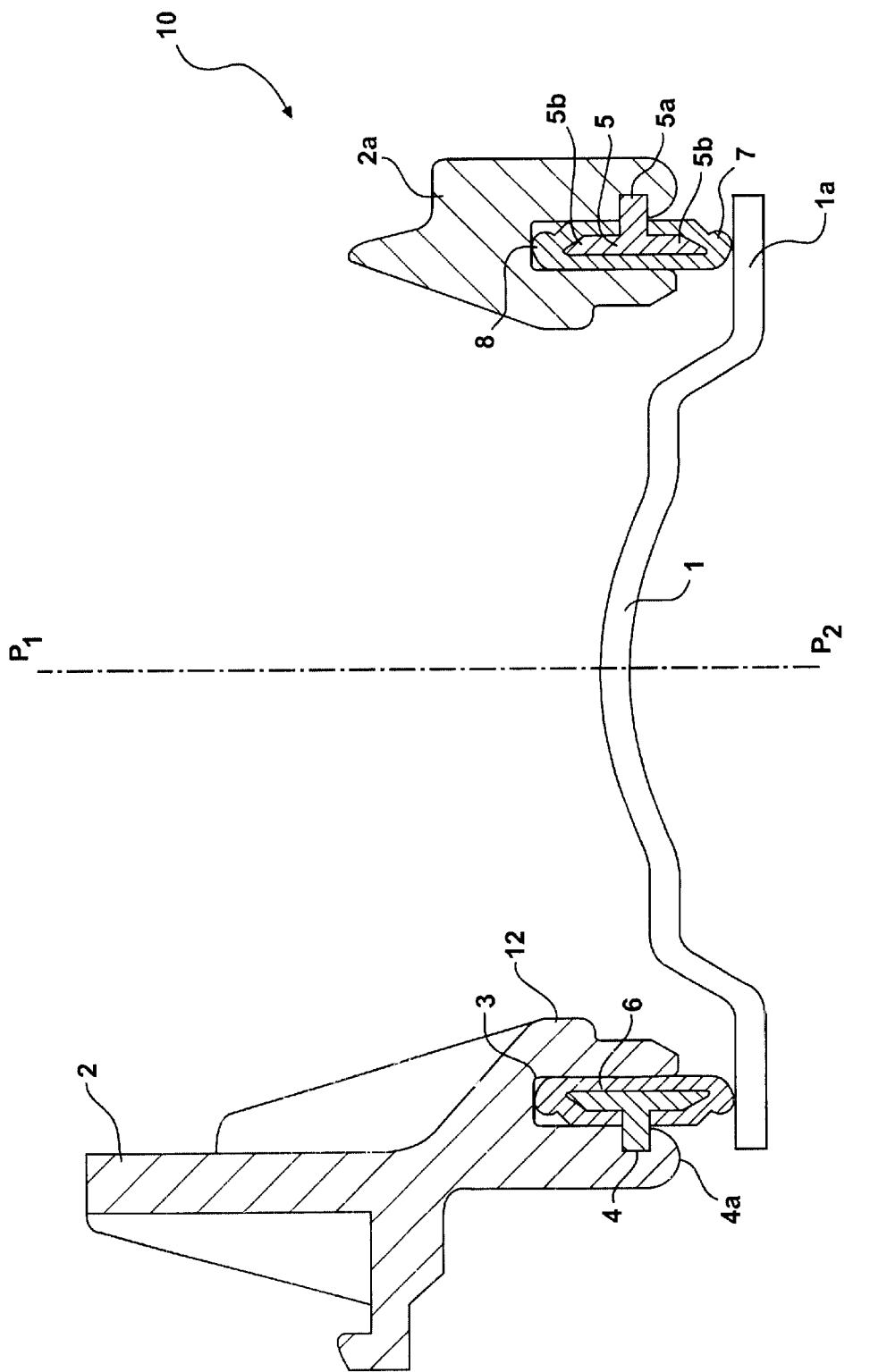
FIG. 1 shows diagrammatically an axial longitudinal section through a partial area of a filler pipe with an internally located closure flap.

Referring to FIG. 1, a filler pipe is generally shown at 10 for a fuel tank of a motor vehicle in which a closure flap 1, arranged and mounted in the interior of the filler pipe 10, is provided instead of the widespread screw-type or bayonet-type closures closing the filler pipe 10 from outside ambient air.

The filler pipe 10 includes an inner housing 2, especially of tubular shape defining an aperture 12 which is closed at the inner end by the closure flap 1 and which consists of plastic. The closure flap 1 can be pivoted into an open position by a fuel pump nozzle (not shown), which is introduced into the filler pipe 10 during filling of the tank in the direction of the arrow $P_1$. After filling of the tank and removal of the fuel-pump nozzle, the closure flap 1 moves, by means of an actuating mechanism (not shown), into a closed position closing the aperture. The arrow $P_2$ symbolizes the action on the closure flap 1.

This actuating mechanism and the further components of the filler pipe 10, which are not shown or described in greater detail here, may be embodied as in the embodiment of a filler pipe shown in FIGS. 1–6 of WO 99/03 697 which is incorporated herein by reference in its entirety.

It is necessary to ensure the presence of a liquid-tight seal which is also at least substantially tight against fuel vapors between the end region of the housing 2 and the marginal region of the closure flap 1. The nature of this seal forms the subject of the present invention. As is apparent from the Figure, the free end region of the housing 2 is formed as a widened receiving area 2a, where either a plurality of recesses 3 distributed over the circumference or one recess 3 extending over the circumference are formed. In the embodiment shown, one groove-like circumferential recess 3 is provided, which is oriented in the axial direction (based on the median axis of the housing 2, extending along the arrows $P_1$ and $P_2$), so that the recess 3 is open at the bottom, toward the closure flap 1. An internal, narrower region makes a transition via a shoulder 4 into a wider region of the recess 3 located further outward. By means of a rim 4a subsequently flanged inward by means of ultrasound, an anchoring part 5a of a seal support 5 is enclosed with positive fitting between the shoulder 4 and rim 4a.

The seal support 5 is a component adapted to the width of the recess 3, is of annular shape and has, in the embodiment shown, a T-shaped cross section. In addition to the anchoring part 5a, the seal support 5 has two supporting parts 5b formed by the bar of the T-shape. The seal support 5 may be composed of metal, or alternatively, of plastic. A single anchoring part 5a running around the seal support 5 may be provided, or a plurality of anchoring parts 5a distributed over the circumference of the seal support 5 and having, in particular, matching cross sections may be provided. In this case, the positive-fitting connection takes place at a plurality of points distributed over the circumference.

The previously mentioned seal is an elastomeric seal 6, especially a rubber seal, having the shape of an annular seal. The seal 6 encloses the supporting parts 5b of the seal body 5 and is vulcanized or directly injected onto the seal support 5. Sealing parts 7, 8 are formed on both sides of the supporting parts 5b, in this case as bead-like shoulders. The sealing effect is produced by the two sealing parts 7, 8, of which one sealing part 7 projects beyond the housing 2 and, when the closure flap 1 is closed, comes to rest on the flaps circumferential marginal region 1a and the second sealing part 8 is pressed by the closure flap 1 against the base of the receiving groove 3.

If the seal support 5 is made from plastic, it can be welded on at the same time as the flanging of the rim 4a.

The invention ensures that swelling of the plastic material of the housing 2, which takes place after prolonged use as a result of the action of the liquid fuel and the fuel vapors, has no effects on the sealing effect of the seal 6 or on its service life.

The invention is not limited to the preferred embodiment shown. Thus, for example, the positive-fitting connection between the seal support 5 and the housing 2 can be implemented in another way, for example by means of a snap connection, screwing or adhesive bonding. The connection may be implemented over the entire circumference of the receiving groove or only at individual points thereon.

The seal may also be embodied differently, for example having sealing lips. The seal support may also have a different shape or a different cross section. In principle, however, the seal and seal supports are to be matched to conform to one another.

The invention has been described in an illustrative manner, and it is to be understood that the terminology, which has been used, is intended to be in the nature of words of description rather than of limitation.

Many modifications and variations of the present invention are possible in light of the above teachings. It is, therefore, to be understood that within the scope of the appended claims, the invention may be practised other than as specifically described.

What is claimed:

1. A filler pipe for a fuel tank of a motor vehicle comprising:
    a tubular housing defining an aperture in fluid communication with the fuel tank;
    a closure flap operatively coupled to said housing and operable between an open position opening said aperture for allowing fuel to fill the fuel tank and a closed position closing said aperture;
    an annular recess formed in said tubular housing adjacent said aperture;
    a T-shaped seal support defined by an outwardly projecting anchoring part and a longitudinally extending supporting part extending from opposing sides of said anchoring part; and
    an elastomeric seal supported by said seal support in said annular recess between said housing and said closure flap, said seal including a first sealing part between said seal support and said housing and a second sealing part between said seal support and said closure flap for providing a fluid impervious seal therebetween.

2. A filler pipe as set forth in claim 1 wherein said first sealing part is fixedly supported by one of said supporting parts of said seal support and said second sealing part is fixedly supported by said other supporting part of said seal support.

3. A filler pipe as set forth in claim 2, wherein said annular recess includes a laterally extending shoulder for receiving and securing said anchoring part of said seal support to said housing.

4. A filler pipe as set forth in claim 3 wherein said seal is vulcanized onto said seal support.

* * * * *

UNITED STATES PATENT AND TRADEMARK OFFICE
CERTIFICATE OF CORRECTION

PATENT NO.   : 6,446,686 B2
DATED        : September 10, 2002
INVENTOR(S)  : Pozgainer et al.

It is certified that error appears in the above-identified patent and that said Letters Patent is hereby corrected as shown below:

Column 1,
Line 14, delete "pipe" and insert -- pipes -- therefor.

Signed and Sealed this

Fourth Day of February, 2003

JAMES E. ROGAN
*Director of the United States Patent and Trademark Office*